AVERAGING OR INTEGRATING DEVICE

Filed Feb. 11, 1959

INVENTORS.
GERALD S. BRINEY
WALDO H. KLIEVER
BY Arthur H. Swanson
ATTORNEY.

3,079,084
Patented Feb. 26, 1963

3,079,084

AVERAGING OR INTEGRATING DEVICE

Gerald S. Briney, Conshohocken, Pa., and Waldo H. Kliever, Cleveland Heights, Ohio, assignors to Minneapolis-Honeywell Regulator Company, Minneapolis, Minn., a corporation of Delaware Filed Feb. 11, 1959, Ser. No. 792,618
11 Claims. (Cl. 235—183)

This invention relates to an apparatus for producing a summation and average of data and more particularly for an improved averaging apparatus using a magnetic memory which maintains a continuing or up-to-date average of a given number of data samplings as new data is added and old data is removed from the apparatus.

Arrangements for performing various computing functions such as addition, division, etc. with analogue and digital type data are known and are the source of much current developmental activity. However, the complexity of the apparatus of this type has precluded its application in most phases of manufacture. The present invention is directed toward a simplified arrangement for performing a computing function by utilizing a magnetic memory apparatus to facilitate a summing and averaging operation.

It is therefore an object of the present invention to provide a simplified averaging apparatus.

It is also an object of this invention to provide an improved averaging or integrating apparatus which maintains a continuing average as new factors are added and old factors are removed.

Another object of this invention is to provide an improved and simplified computing apparatus utilizing a magnetic memory device which will determine and maintain a continuing average of data regardless of the frequency at which the factors are considered.

These and other objects of this invention will become apparent from a reading of the attached description together with the drawing wherein.

Figures 1, 2, 3:
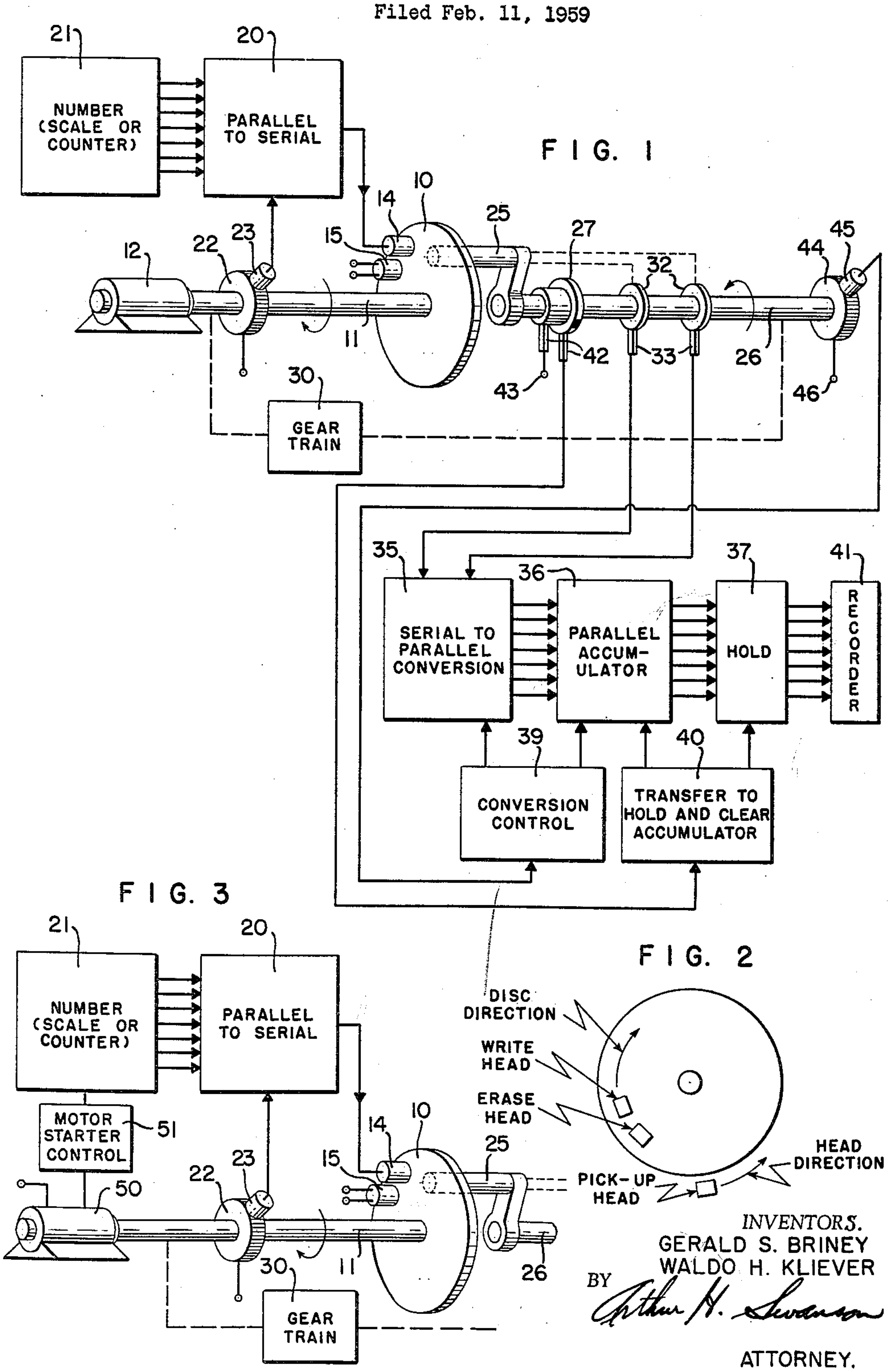
FIG. 1 is a schematic diagram of a computing apparatus embodying the present invention.
FIG. 2 is a representation of a memory device with recording, erasing, and pickup heads for use with the computing apparatus shown in FIG. 1.
FIG. 3 is a schematic diagram of a somewhat different structure for a computing apparatus also embodying the present invention.

An improved apparatus for performing a summing and averaging operation is shown schematically in FIG. 1. The improved apparatus includes a disc of magnetic material 10, mounted on a shaft 11 and driven by means of a motor 12. While there is shown a disc as the magnetic storage apparatus or device of the subject invention, it will be appreciated that any continuous magnetic element such as a drum, tape, etc. may be employed herein. Associated with the outer edge of the disc 10 is a writing or recording head indicated at 14; the writing head is positioned adjacent the disc 10 and is adapted to receive signals such that it may magnetize incremental areas of the peripheral edge of the disc to store the signals thereon.

Positioned adjacent the recording head 14 is an erasing head 15 of similar shape and structure, this bead being utilized in a conventional manner to eradicate magnetic signals from the rim of the disc. The erasing head 15 is adapted to be continuously energized from an electrical source of power to generate a magnetic field to demagnetize the magnetized portions of the disc. The writing and erasing heads 14 and 15 are positioned adjacent to each other with a spacing determined primarily by the desire to hold the inactive portion of the disc down to the minimum space required to store a composite signal, composed of a predetermined number of incremental magnetic areas, representing an analogue signal supplied to the apparatus. The recording and erasing heads are further positioned stationarily with respect to the rotating disc and are mounted with the recording head positioned forward of the erasing head with relation to the direction of rotation of the disc 10. The disc 10 is continuously driven by the motor 12 at a constant speed. The recording head 14 also has associated therewith a quantizer or conversion apparatus 20 which takes signals supplied from a source such as a measuring apparatus 21. These signals may be in a parallel digital code which may be converted to a serial digital code by a conversion apparatus 20. In order that the supply of signals from the measuring apparatus 21 is synchronized with the rotation of the disc, there is included in the apparatus a commutating member 22 having an associated brush 23. The commutator 22 is mounted on the shaft 11, and the brush 23 is stationarily mounted with relation to the commutator. This apparatus provides a synchronizing signal to the converter 20 such that the elements of the composite, or coded signal, in a serial digital code, will be impressed on the disc 10 only when the latter is in one of a plurality of predetermined positions with relation to the recording and erasing heads 14 and 15.

Also associated with the disc 10 is a pickup head 25 mounted on a shaft 26 through a driving linkage. The shaft 26, in turn, is mechanically connected through a suitable gear train 30 to the shaft 11 driven by the motor 12. The direction of the rotation of the pickup head 25 is opposite to that of the disc 10. Also, the pickup head is rotated at a speed N times the speed of rotation on the disc wherein N is the number of composite signals stored on the disc in a complete revolution of the same. A complete revolution of the disc 10 corresponds to the transfer of an incremental magnetic area from the recording head 14 to the erasing head 15. Thus, the complete revolution is less than the circumferential length of the disc 10 by the previously mentioned inactive area representing the spacing of the erasing head to the recording head. The pickup head 25 is an inductive apparatus which is magnetically associated with the disc to produce a signal voltage for each magnetized increment of the disc corresponding to the elements of the composite signal supplied from the recording head 14. A pair of slip rings 32, with associated stationary brushes 33, are, also, connected to the shaft 26. This apparatus serves to take the signals from the pickup head 25 to energize a series-to-parallel conversion unit 35. The latter unit feeds signals to a serial combination of a parallel accumulator 36 and a hold accumulator 37.

Associated with the series-to-parallel conversion unit 35 and the parallel accumulator 36 is a conversion control unit 39 and a transfer-to-hold and clear apparatus 40 which controls the triggering of the hold accumulator 37. The conversion control unit 39 may be controlled by any suitable means related to shaft position. For example, a synchronizing unit similar to synchronizer 22, 23 and including a commutator 44 and a brush 45 is shown as associated with the shaft 26, with the commutator 44 mounted on the shaft 26 and the brush 45 stationarily mounted. This synchronizing apparatus applies synchronizing signals, supplied to a terminal 46 from an outside source, to the conversion control 39 such that the components of the composite signal in serial digital form will be received by the converter 35 in proper sequence and gated therefrom to the parallel accumulator 36.

The transfer control 40 controls the transfer of data from the parallel accumulator 36 to the hold apparatus and clears the parallel accumulator. This transfer control is controlled by a signal received from a cam apparatus or commutator 27 mounted on shaft 26 and having brushes 42 associated therewith. A signal supply is connected to a terminal 43 of one of the brushes 42 to control the transfer apparatus 40 when the commutator circuit is deenergized due to the non-conductive portion of the commutator 27 reaching the brushes 42. This nonconductive portion is arranged to reach the brushes 42 when the pickup head 25 passes between the recording and erasing heads. Inasmuch as there are no signals in this area, no provision is made to isolate the pickup head from the counter 21 and converter 20 at this time. The output of the hold accumulator 37, in turn, is fed to a recorder 41 which indicates periodically the sum of the last N signals applied to the disc 10 as new signals are added and old signals removed therefrom. The recorder 41, receiving the summed signals from the hold apparatus may be desensitized by a constant factor to give the average of N signals which is directly proportional to the sum of the N signals, or a divider unit may be included therewith or with the register 37 to produce the desired average for recording or indication purposes. Summarizing the above, the disc 10 rotates $1/N$ revolutions in relation to the single revolution of the shaft 26 during which time a single signal of the analogue type is sensed, converted to a parallel digital coded signal by the measuring apparatus 21, and further is converted to serial coded signal by the conversion apparatus 20 to be applied to the disc 10 by the recording head 14. During the same period of time, the pickup head 25 is rotated through a single revolution to sense all the composite signals impressed on the disc. The signals from the pickup head 25 are converted by the converter 35 and are, subsequently, summed by the parallel accumulator 36. The end of a single revolution of the pickup head 25 is determined by the position of the non-conducting segment of the commutator 27, as previously mentioned. Consequently, at the end of a single revolution of the pickup head, the composite signals accumulated by the accumulator 36 are transferred to the hold apparatus 37, and the accumulator 36 is cleared.

Reference is made to FIG. 2 to establish that the direction of rotation of the disc 10 is opposite to the direction of rotation of the pickup head 25 and to show the relative positions of the recording and erasing heads 14 and 15, respectively.

The sensing and conversion controls 21, 20 which produce and convert analogue signals to serial type digital code signals are shown here in block form inasmuch as such units are well known in the art. A suitable device for the sensing unit and digitizer 21 is shown in the Gridley Patent 2,575,342, dated November 20, 1951 to be of the binary digital type; i.e. this device converts analogue signals to parallel binary digital signals. Parallel to serial or serial to parallel conversion units suitable for the converters 20 or 35 are disclosed in "High Speed Computing Devices" by Engineering Research Associates, 1st edition published by the McGraw-Hill Book Company in 1950, chapter 13, section 13.2. Similarly, the accumulator 36, conversion control 39, hold apparatus 37, and transfer-to-hold apparatus are shown in block form inasmuch as their details form no part of the subject incention and such devices are also well-known in the art. Suitable accumulators and hold apparatus or registers with associated switching and gating circuits, of a type suitable for the conversion control and transfer-to-hold apparatus discussed above, are disclosed in the text "Automatic Digital Calculators" by Booth and Booth published by Academic Press, Incorporated, N.Y., 1st edition, 1953, referred to in chapters 9, 10 and 11 thereof. Another suitable accumulator with associated gating circuits for use with the present invention is shown in Patent No. 2,705,108 by J. J. Stone, Jr. which was filed on August 14, 1952. A suitable circuit for performing the gating function of the conversion control 39 and the transfer-to-hold apparatus 40 is also shown in the aforesaid patent in FIG. 4 thereof. Thus, the signals from the commutator 27 and the commutator 44 may be transferred through the circuit shown in FIG. 4 of the aforesaid patent to control the transfer of the information held in the accumulator shown in that patent and to effect a reset or clearing of this accumulator. The hold apparatus 37 may also be a device as shown in the aforesaid patent or may be simply a plurality of bi-stable circuits which are triggered individually to a stable state by a signal transferred from a corresponding storage element of the accumulator 39.

In the subject apparatus, the composite signals supplied by the sensing apparatus 21 must be supplied at a constant frequency and at a rate comparable to the speed of rotation of the disc 10 to provide for the magnetization of the incremental areas of the disc corresponding to the respective elements of the composite signals derived from the analogue type data. This is accomplished, however, by presetting the speed of rotation of the motor 12 to a speed proportional to the speed that the analogue signals are supplied to apparatus 21.

In operation, assuming that the sensing apparatus 21 is supplying signals to the conversion apparatus 20 at a constant rate, with a conversion from analogue type data, to parallel binary digital coded data and to serial binary digital coded data, the composite signals will be supplied to the recording head 15 at a predetermined frequency. The disc 10 is correspondingly magnetized in accordance with a series of groups of pulse and lack of pulse combinations, each group representing a composite signal, until the peripheral active edge of the disc is filled. Upon further rotation of the disc 10, the oldest composite signals will begin to be removed by the erasing head 15 as newer composite signals are added to the disc 10. As previously mentioned, a predetermined number of segments of the peripheral area of the disc 10 are available to receive the composite signals from the recording head 14. The area of each of these segments is determined by the number of incremental magnetic areas needed to record the maximum expected composite signal. Thus, the number of these segments; and, consequently, the number of recorded composite signals, is dependent on the maximum expected analogue signals. The number of recording segments, in turn, determines the number of segments on the synchronizing commutator 22. As the disc 10 is moved relative to the recording head 14 a distance equal to one recording segment, the pickup head will make a complete revolution of the peripheral edge of the disc 10, to sense all the groups of incremental areas representing the recorded composite signals on the disc 10.

Thus, for example, it may be assumed that the sensing apparatus 21 is a scale mechanism across which is fed a continuous supply of uniformly spaced items to be weighed. The rate at which the items are weighed is arranged to be related to the speed of operation of the motor 12 through external means (not shown), and, as each item is weighed, the disc 10 will move a predetermined distance equal to one recording segment. During this interval, the commutator synchronizer 22 will provide a signal to the converter 20 to allow it to convert the parallel binary digital data from the sensing apparatus 21 to serial binary digital data. This data will be supplied to the recording head as a series of pulses or blanks to selectively affect incremental areas of the disc 10 within a recording segment. The serial digital data is completely transferred to the disc 10 during the period of the signal from the commutator synchronizer 22. When the next item is brought to the scale mechanism, the commutator synchronizer 22 and the disc 10 will have moved to a position to establish a recording circuit for the serial data representing the next item. The recording process is continued at a uniform rate as each succeeding item is weighed until the disc 10 has rotated one complete revolution at which time the erasing head 15 will begin to remove the composite signals first placed on the disc and succeeding data as new data is added.

The pickup head 25, as indicated above rotates one complete revolution during the period in which the disc 10 rotates the fraction of a revolution representing a recording segment. As head 25 rotates, it senses the magnetized increments of the serial binary digital code for each composite signal, and thus, the information is transferred to the converter 35. The converter 35, in turn, transforms the serial digital data to parallel type digital data and transfers the converted data to the accumulator 36. Conversion control 39 receives synchronizing pulses corresponding to each composite signal and starts and stops the converter 36 for the conversion of each composite signal. It also controls the accumulator 38 to receive and to sum the converted composite signals coming from the converter 35. The commutator type trigger apparatus 27 signals each revolution of the pickup head 25 to the transfer apparatus 40 to switch the summed data in the accumulator 36 to the hold apparatus 37 for further transfer to the recorder 41. With each revolution of the pickup head 25, the transfer apparatus, also, clears the accumulator 36 to prepare the accumulator for a summation of a new group of data signals from the conversion unit 39.

Thus, the individual weight data signals will be transformed to serial digital coded data, impressed on the disc, sensed with the preceding composite signals on the disc, summed with the preceding composite signals on the disc and the summed signal periodically transferred to the recorder.

It will be evident that if a constant number of signals are supplied to the disc for each rotation of the same, a summation of that number of signals will be obtained by the recorder 41 and an average of these signals will be effected by virtue of the fact that a constant number of analogue type signals are being supplied to the apparatus during this period. As indicated previously, the recorder 41 may be adjusted to compensate for the constant factor of the units to be averaged, thereby converting the summation of the signals to an average of the signals. It will further be evident that this average will be maintained over the last N signals to be applied to the disc wherein the N represents the number of signals supplied to the disc for a single rotation of the same.

A somewhat different structure for the embodiment of the present invention is shown, in part, in FIG. 3; it being understood that only that part of the apparatus which differs from the preferred embodiment shown in FIG. 1 is included herein. This modification has utility for an averaging of a plurality of signals which are applied to the apparatus at irregular intervals as distinguished from the fixed rate or frequency of application of signals as discussed above. In this modification, the motor 50 is not a continuously running type but is, rather, intermittently operated with a constant speed of rotation for each intermittent operation. This motor revolves through a constant predetermined angular distance upon receipt of an energizing signal from a controlling starter 51 responsive to a signal from the measuring apparatus 21. Thus, the motor 50 is rotated a predetermined distance for each analogue signal received by the measuring apparatus 21. The operation of the averaging apparatus of the present invention with the modification, shown in FIG. 3, is similar to that discussed above in relation to FIG. 1 except for the triggered movement of the motor 50. In this embodiment, the synchronizers, that is the commutators and associated signal circuits are retained for synchronizing the converters 20 and 35, the accumulator 36 and the hold apparatus 37 with the intermittent motion of the motor 50.

The triggered movement of the motor 50 is modified by the gear train 30 to provide a complete rotation of the pickup head 25 for each trigger signal supplied to the motor 50. Thus, regardless of the lack of constant frequency of the supply of signals, an average is maintained of the last N signals supplied to the apparatus.

Thus, it may be seen that there has been provided, in accordance with the present invention an averaging apparatus utilizing a magnetic memory device, which is characterized by the ability to determine a continuing average of data signals as new signals are received and old signals are removed and to maintain a continuing average regardless of the frequency at which new signals are received.

The present application is a continuation-in-part of application, Serial No. 424,641, filed April 21, 1954, now abandoned.

What is claimed is:

1. In a device of the class described, in combination, a disc of magnetic material mounted for rotational movement, a recording head positioned in near proximity to said disc for recording coded data signals on segmental areas of said disc as it moves relative thereto, a magnetic pickup head pivotally mounted in near proximity to said disc and adapted to rotate relative to said disc, means for accumulating signals picked up by said magnetic pickup head, switching means operated by said pickup head and connected to said means for accumulating to control the starting and stopping of said means for accumulating, motor means for driving said disc and said pickup head such that said pickup head rotates one revolution for a predetermined partial revolution of said disc required to place a data signal on a segmental area of said disc from said recording head, and means positioned adjacent said recording head and said disc for erasing the oldest signals on said disc as said recording head places a new signal thereon.

2. In a device of the class described, in combination, a disc of magnetic material mounted for rotational movement, a recording head positioned in near proximity to said disc and adapted to magnetize incremental areas of said disc as it moves relative thereto, a magnetic pickup head pivotally mounted in near proximity to said disc and adapted to rotate relative to said disc, means for accumulating signals picked up by said magnetic pickup head, switching means operated by said pickup head and connected to said means for accumulating to control the starting and stopping of said means for accumulating, motor means for driving said disc and said pickup head such that said pickup head rotates one revolution for a predetermined partial revolution of said disc required to place a signal on said incremental areas of said disc from said recording head, erasing means positioned adjacent said recording head and said disc for erasing the oldest signals on said disc as said recording head places a new signal thereon and means responsive to said means for accumulating for recording the summation of all of the signals picked for each revolution of said pickup head.

3. An apparatus for averaging a plurality of signals comprising a disc of magnetic material mounted for rotational movement, a quantizer for converting the magnitudes of said plurality of signals into digital pulses, a recording head connected to said quantizer and positioned in near proximity to said disc being adapted to magnetize incremental areas of said disc from said digital pulses as the disc moves relative to said recording head, a magnetic pickup head pivotally mounted in near proximity to said disc and adapted to rotate relative to said disc, accumulating means responsive to signals picked up by said magnetic pickup head, switching means operated by said pickup head and connected to said accumulating means to control the starting and stopping of said accumulating means, motor means for driving said disc and said pickup head such that said pickup head rotates one revolution for a predetermined partial revolution of said disc required to place a signal on said incremental areas of said incremental areas of said disc from said recording head, and erasing means positioned adjacent said recording head, and said disc for erasing the oldest signals on said disc as said recording head places a new signal thereon.

4. Apparatus for averaging N signals and maintaining said average up to date as a new signal is added to the apparatus and an old signal is erased therefrom comprising a member having a peripheral surface of magnetic material and mounted for rotational movement, a recording head positioned in near proximity to said peripheral surface and adapted to magnetize incremental areas of said surface as the surface moves relative thereto, a quantizer for converting the magnitudes of said N signals into digital pulses, means connecting said quantizer to said recording head such that said recording head magnetizes said surface in response to said pulses, a pickup head positioned in near proximity to said peripheral surface said member and adapted to rotate relative thereto, accumulating means responsive to the number of magnetized areas of said peripheral surface as sensed by said pickup head, said accumulating means being connected to said pickup head and operated thereby, switching means operated by said pickup head and connected to said accumulating means to control the starting and stopping of said accumulating means, motor means for driving said member and said pickup head such that said peripheral surface moves at a speed relative to said pickup head at a ratio of $1/N$, and erasing means continuously energized and positioned adjacent said peripheral surface for removing the old signals therefrom.

5. Apparatus for averaging N signals and maintaining said average up to date as a new signal is added to the apparatus and an old signal is erased therefrom comprising, a member having a peripheral surface of magnetic material and mounted for rotational movement, a recording head positioned in near proximity to said peripheral surface and adapted to magnetize incremental areas of said surface as the surface moves relative thereto, a quantizer for converting the magntiudes of said N signals into digital pulses, means connecting said quantizer to said recording head such that said recording head magnetizes said surface in response to said pulses, a pickup head positioned in near proximity to said peripheral surface and adapted to rotate relative thereto, accumulator means for accumulating the number of magnetized areas of said peripheral surface as sensed by said pickup head, said accumulator means being connected to said pickup head and operated thereby, switching means operated by said pickup head and connected to said accumulator means to control the starting and stopping of said accumulator means, motor means for driving said member and said pickup head such that said peripheral surface moves at a speed relative to said pickup head at a ratio of $1/N$, means continuously energized and positioned adjacent said peripheral surface for removing the old signals therefrom, and means responsive to said accumulator means for recording the summation of all of the signals sensed by said pickup head during each revolution thereof.

6. Apparatus for averaging N signals and maintaining said average up to date as a new signal is added to the apparatus and an old signal is erased therefrom comprising, a recording member having a peripheral surface of magnetic material and mounted for rotational movement, a recording head positioned in near proximity to said peripheral surface and adapted to magnetize incremental areas of said surface as the surface moves relative thereto, a quantizer for converting the magnitudes of said N signals into digital pulses, means connecting said quantizer to said recording head such that said recording head magnetizes said surface in response to said pulses, a pickup head positioned in near proximity to said peripheral surface of said recording member and adapted to rotate relative thereto, means for accumulating the number of magnetized areas of said peripheral surface as sensed by said pickup head, said accumulating means being connected to said pickup head and operated thereby, switching means operated by said pickup head and connected to said accumulating means to control the starting and stopping of said accumulating means, motor means for driving said recording member and said pickup head such that said peripheral surface moves at a speed relative to said pickup head at a ratio of $1/N$, erasing means continuously energized and positioned adjacent said peripheral surface for removing the old signals therefrom, and control means connected to said motor means for advancing said peripheral surface and said pickup head for each new signal supplied to the apparatus.

7. In apparatus for averaging N signals and maintaining said average up to date as a new signal is added to the apparatus and the old signal is erased therefrom, a recording member having a peripheral surface of magnetic material and mounted for rotational movement, a recording head positioned in near proximity to said peripheral surface and adapted to magnetize incremental areas of said surface as it moves relative thereto, a quantizer for converting said N signals into digital pulses, means connecting said quantizer to said recording head to control the magnetization in response to said digital pulses, a pickup head pivotally mounted in near proximity to said peripheral surface and adapted to rotate relative thereto, means for accumulating the magnetized incremental areas of said peripheral surface as they are sensed by said pickup head, switching means connected to said means for accumulating and operated by said pickup means as it starts and completes a sweep of said peripheral surface to control the starting and stopping of said accumulating means, advancing means connected to said recording member and said pickup head for advancing said recording member 1/N revolutions and said pickup head 1 revolution for each new signal added to said apparatus, control means responsive to said incoming signal to control the operation of said advancing means, and erasing means positioned near said peripheral surface for erasing the oldest signals thereon as said recording head places new signals thereon.

8. In apparatus for averaging N signals, a recording member having a peripheral surface of magnetic material, converting and recording means for receiving said incoming signals, converting the incoming signals in proportion to the magnitudes thereof into a measurable quantity and magnetizing incremental areas of said peripheral surface in proportion to the magnitudes of said incoming signals, said means including a recording head positioned adjacent said peripheral surface with said peripheral surface moving relative thereto, a pickup head pivotally mounted in near proximity to said peripheral surface and adapted to move relative to said peripheral surface, accumulator means for accumulating the number of magnetized areas of said peripheral surface as sensed by said pickup head, said accumulator means being connected to said pickup means and operated thereby, switching means operated by said pickup head and connected to said accumulator means to control the starting and stopping of said accumulating means, motor means for driving said recording member and said pickup head such that said peripheral surface moves at a speed relative to said pickup head at a ratio of $1/N$, and erasing means continuously energized and positioned adjacent said peripheral surface for removing the old signals therefrom.

9. In apparatus for averaging N signals, a recording member having a peripheral surface of magnetic material, means receiving said incoming signals and converting the incoming signals in proportion to the magnitudes thereof into a measurable quantity and magnetizing incremental areas of said peripheral surface in proportion to the magnitudes of said incoming signals, said means including a recording head positioned adjacent said peripheral surface with said peripheral surface moving relative thereto, a pickup head pivotally mounted in near proximity to said peripheral surface and adapted to move relative to said peripheral surface, accumulator means for accumulating the number of magnetized areas of said pgeripheral surface as sensed by said pickup head, said accumulator means being connected to said pickup head and operated thereby, switching means operated by said pickup head and connected to said accumulator means to control the starting and stopping of said accumulator means, advancing means connected to said recording member and said pickup head for advancing said member 1/*N* revolutions and said pickup head 1 revolution for each new signal added to said apparatus, control means responsive to said incoming signal to control the operation of said advancing means, and erasing means positioned near said peripheral surface for erasing the oldest signals thereon as said recording head places new signals thereon.

10. In apparatus for averaging N signals and maintaining said average up to date as new signals are added to the apparatus and old signals are erased therefrom, a continuous surface of magnetic material adapted to be moved along a predetermined path, a recording head positioned in near proximity to said magnetic material and to said path and adapted to magnetize incremental areas of said magnetic material as it moves relative thereto, a pickup head mounted in near proximity to said magnetic material and adapted to move along said continuous surface relative thereto, converting means connected to said recording head and converting the magnitude of the incoming signals into a measurable quantity such that such magnetic material is magnetized in proportion to the magnitude of said incoming signals, said pickup head having induced therein a plurality of voltage signals in proportion to the magnitudes of said incoming signals as said pickup head is moved relative to said continuous surface, accumulating means responsive to said plurality of signals from said pickup head to produce a summation of all of the signals on said magnetic material and to provide an average therefrom, and erasing means positioned adjacent said surface for erasing old signals as new signals are placed on said surface.

11. In apparatus for averaging N signals and maintaining said average up to date as new signals are added to the apparatus and old signals are erased therefrom, a continuous surface of magnetic material adapted to be moved along a predetermined path, a recording head positioned in near proximity to said magnetic material and to said path and adapted to magnetize incremental areas of said magnetic material as it moves relative thereto, a pickup head mounted in near proximity to said magnetic material and adapted to move along said continuous surface relative thereto, converting means connected to said recording head for converting the magnitude of the incoming signals into a measurable quantity such that said magnetic material is magnetized in proportion to the magnitude of said incoming signals, said pickup head having induced therein a plurality of voltage signals in proportion to the magnitudes of said incoming signals as said pickup head is moved along relative to said continuous surface, accumulating means responsive to the plurality of voltage signals from said pickup head to produce a summation of all of the signals on said magnetic material and provide an average therefrom, and erasing means positioned adjacent said continuous surface of magnetic material for erasing the oldest signal on said surface as said recording head places a new signal thereon.

References Cited in the file of this patent

UNITED STATES PATENTS

| | | |
|---|---|---|
| 1,664,243 | Chubb | Mar. 27, 1928 |
| 2,190,497 | Whitby et al. | Feb. 13, 1940 |
| 2,416,849 | Schaefer | Mar. 4, 1947 |
| 2,575,342 | Gridley | Nov. 20, 1951 |
| 2,645,420 | Hatton et al. | July 14, 1953 |
| 2,680,241 | Gridley | June 1, 1954 |
| 2,682,369 | Doersam | June 29, 1954 |
| 2,775,755 | Sink | Dec. 25, 1956 |
| 2,855,147 | Greening | Oct. 7, 1958 |
| 2,915,246 | Piety | Dec. 1, 1959 |

FOREIGN PATENTS

| | | |
|---|---|---|
| 564,398 | Canada | Oct. 7, 1958 |